US009399469B1

(12) United States Patent
Harrison

(10) Patent No.: US 9,399,469 B1
(45) Date of Patent: Jul. 26, 2016

(54) ALARM ASSEMBLY

(71) Applicant: Loistine Harrison, Darlington, SC (US)

(72) Inventor: Loistine Harrison, Darlington, SC (US)

( * ) Notice: Subject to any disclaimer, the term of this patent is extended or adjusted under 35 U.S.C. 154(b) by 0 days.

(21) Appl. No.: 14/706,943

(22) Filed: May 7, 2015

(51) Int. Cl.
*G08B 21/00* (2006.01)
*B60W 40/08* (2012.01)
*B60Q 9/00* (2006.01)

(52) U.S. Cl.
CPC ................. *B60W 40/08* (2013.01); *B60Q 9/00* (2013.01); *B60W 2040/0881* (2013.01)

(58) Field of Classification Search
CPC ...................................................... B60W 40/08
USPC ............................................... 340/457, 457.1
See application file for complete search history.

(56) References Cited

U.S. PATENT DOCUMENTS 5,684,462 A 11/1997 Gold
6,900,722 B1 5/2005 Gotauco
6,909,365 B2 6/2005 Toles
D622,195 S 8/2010 Lester
2006/0208911 A1 9/2006 Davis
2008/0174425 A1* 7/2008 Torning ............. G08B 13/1427 340/540
2012/0119896 A1 5/2012 Lam et al.
2013/0194089 A1 8/2013 Estrada
2014/0159884 A1* 6/2014 Braun ..................... B60R 99/00 340/433
2014/0188305 A1* 7/2014 Wiedner ................ G07C 5/008 701/2
2014/0333769 A1* 11/2014 Shibuya ................. H04N 7/183 348/148

* cited by examiner

*Primary Examiner* — Brent Swarthout

(57) ABSTRACT

An alarm assembly includes a vehicle. A housing is provided that has a mount portion and a display portion and the housing is positioned within the vehicle. A tracking unit is coupled to the housing and the tracking unit is operationally coupled to the vehicle. The tracking unit is manipulated to record a number of passengers in the vehicle before the vehicle can be turned on. The tracking unit is manipulated to acknowledge the number of passengers in the vehicle before the vehicle can be turned off thereby preventing the passengers from being inadvertently left in the vehicle.

10 Claims, 5 Drawing Sheets

ALARM ASSEMBLY

BACKGROUND OF THE DISCLOSURE

Field of the Disclosure

The disclosure relates to alarm devices and more particularly pertains to a new alarm device for preventing passengers from being inadvertently left in a vehicle.

SUMMARY OF THE DISCLOSURE

An embodiment of the disclosure meets the needs presented above by generally comprising a vehicle. A housing is provided that has a mount portion and a display portion and the housing is positioned within the vehicle. A tracking unit is coupled to the housing and the tracking unit is operationally coupled to the vehicle. The tracking unit is manipulated to record a number of passengers in the vehicle before the vehicle can be turned on. The tracking unit is manipulated to acknowledge the number of passengers in the vehicle before the vehicle can be turned off thereby preventing the passengers from being inadvertently left in the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
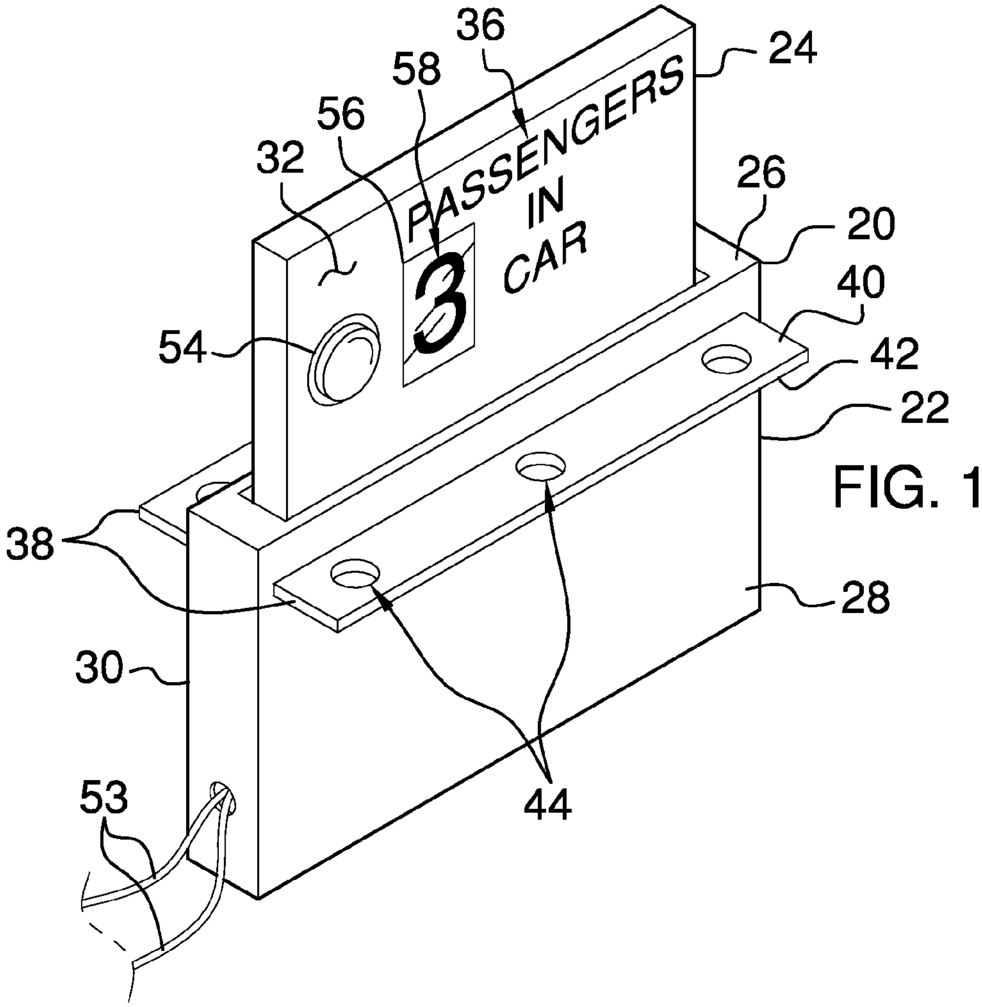
FIG. 1 is a right side perspective view of a alarm assembly according to an embodiment of the disclosure.
Figure 2:
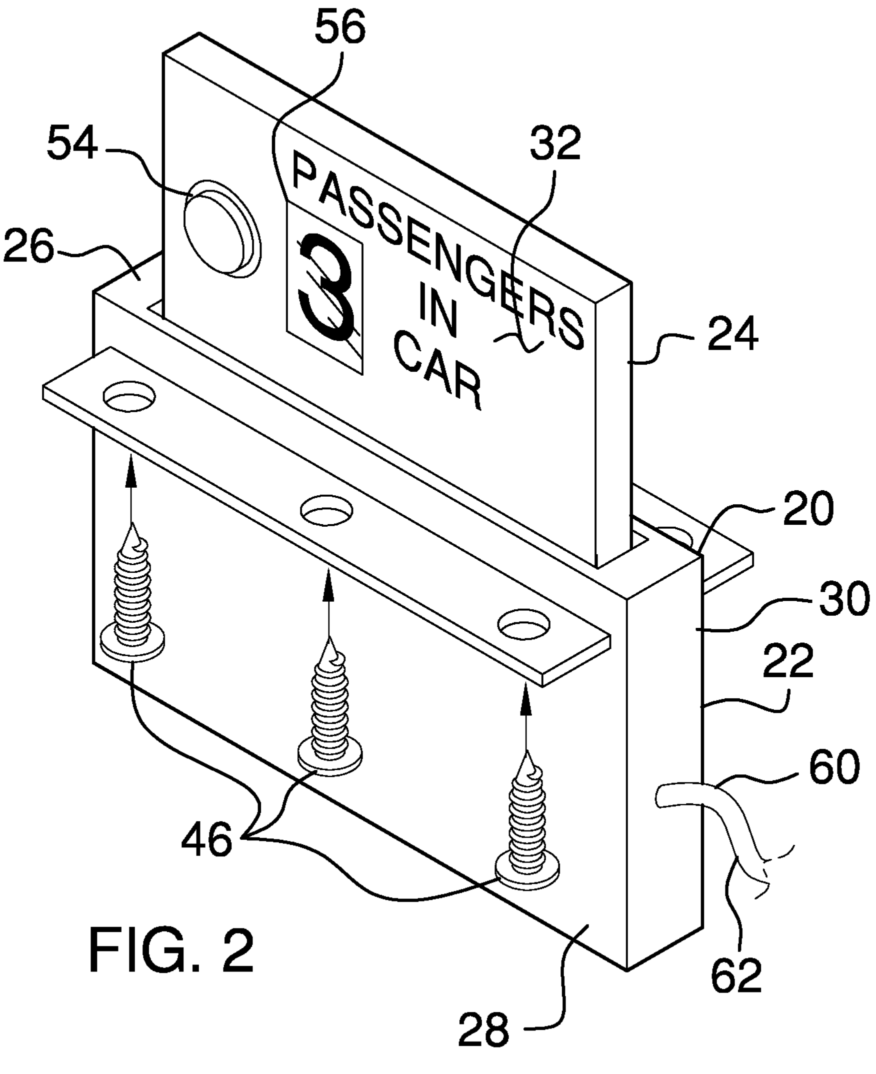
FIG. 2 is a left side perspective view of an embodiment of the disclosure.
Figure 3:
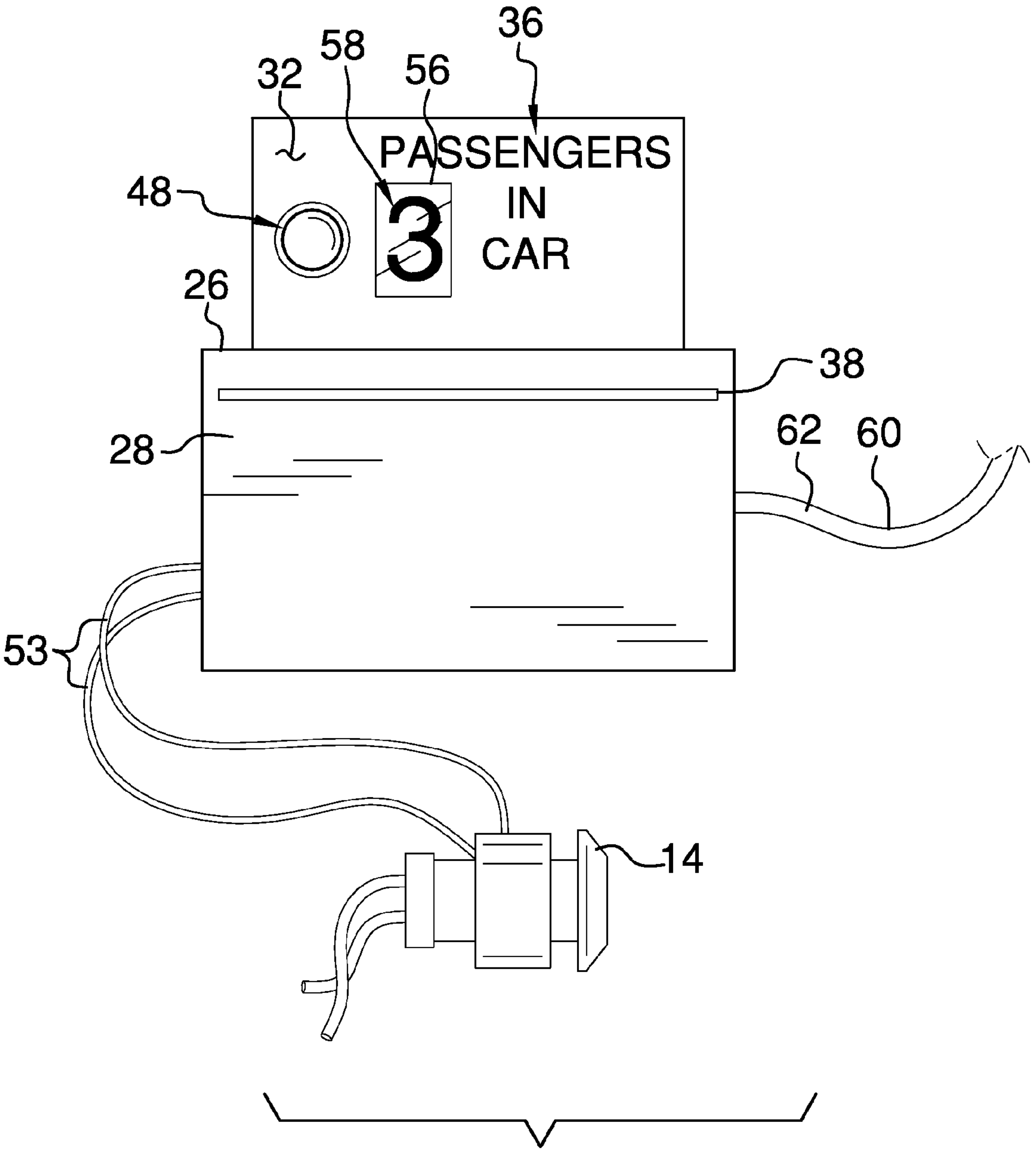
FIG. 3 is a front view of an embodiment of the disclosure.
Figure 4:
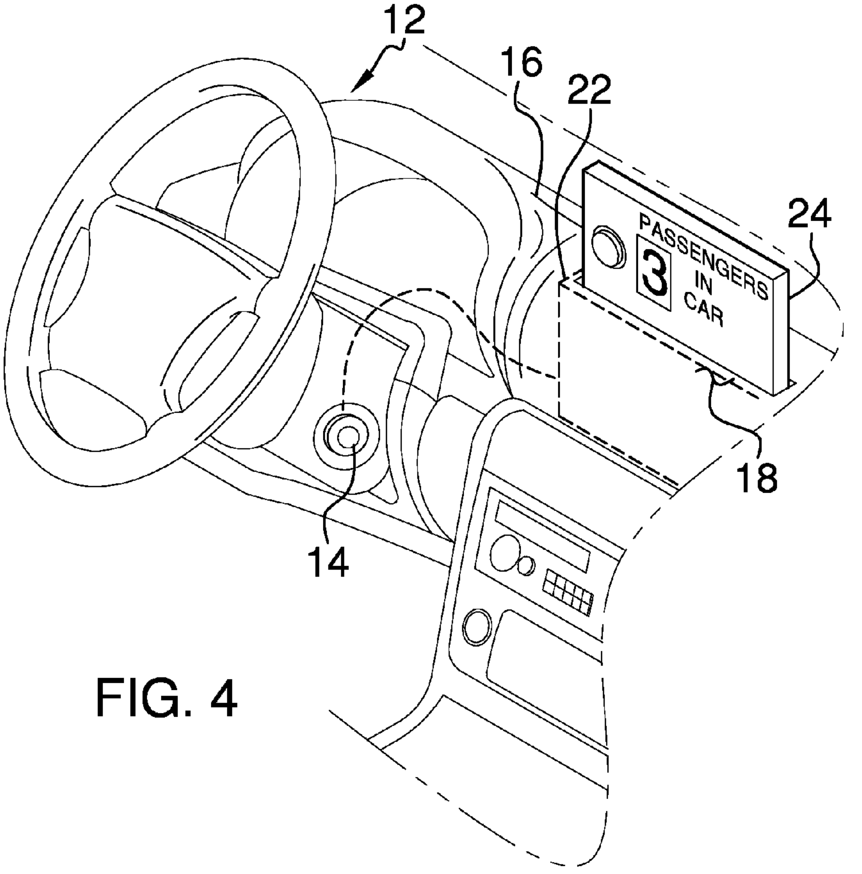
FIG. 4 is a perspective in-use view of an embodiment of the disclosure.
Figure 5:
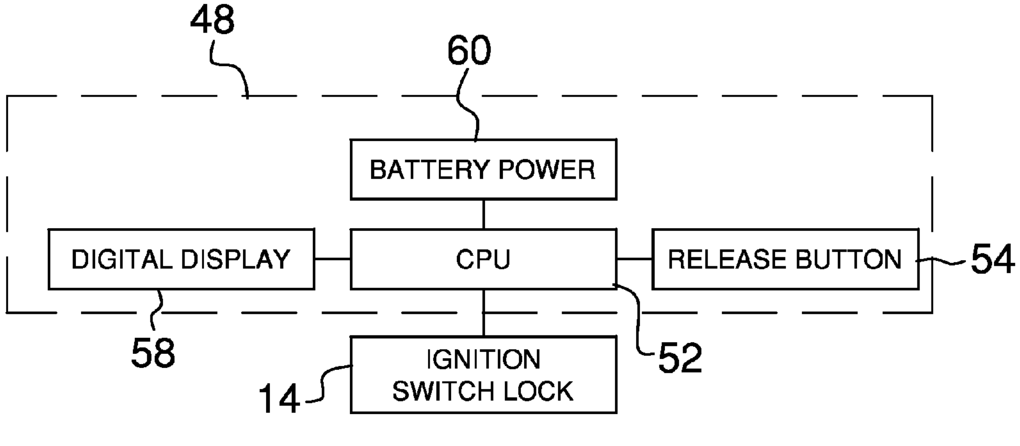
FIG. 5 is a schematic view of an embodiment of the disclosure.
Figure 6:
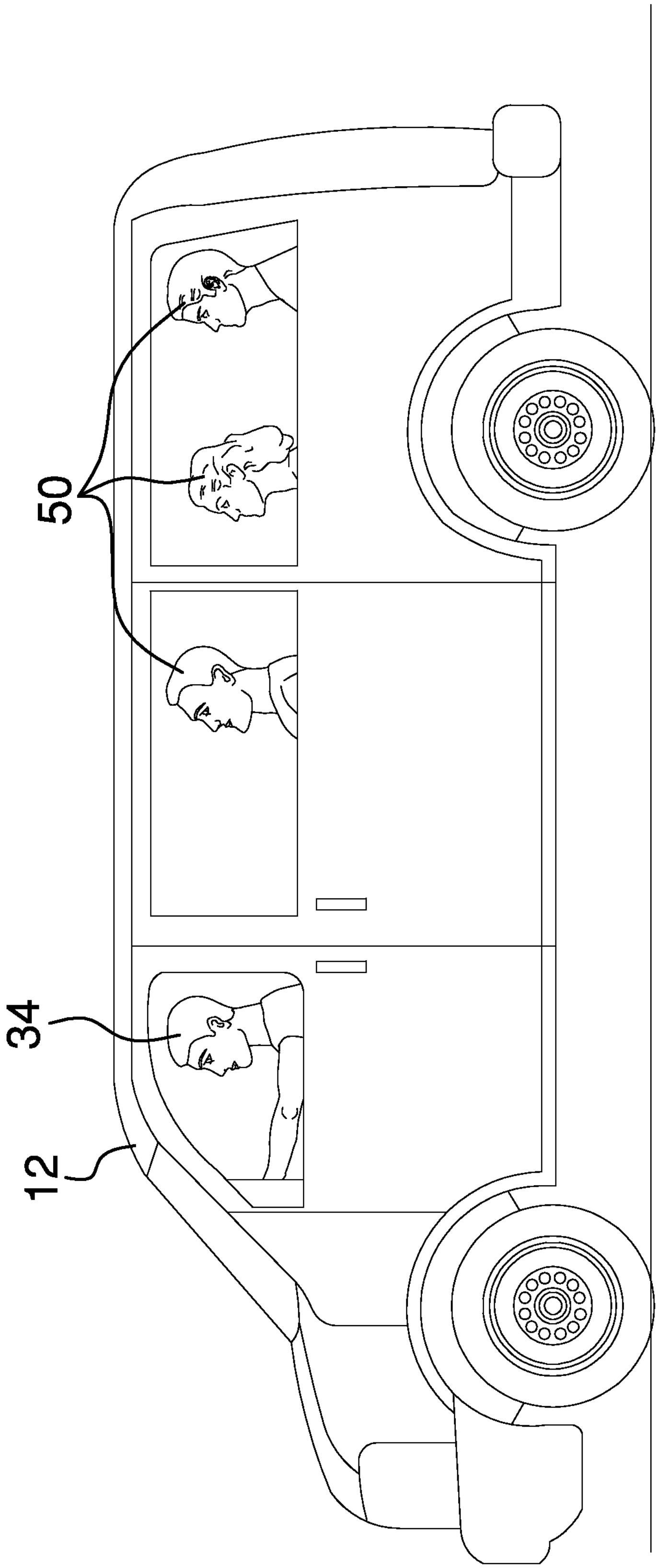
FIG. 6 is a left side in-use view of an embodiment of the disclosure.

With reference now to the drawings, and in particular to FIGS. 1 through 6 thereof, a new alarm device embodying the principles and concepts of an embodiment of the disclosure and generally designated by the reference numeral 10 will be described.

As best illustrated in FIGS. 1 through 6, the alarm assembly 10 generally comprises a vehicle 12 that has an ignition 14 and a dashboard 16. The dashboard 16 has an inner surface 18 and the vehicle 12 may be a passenger vehicle or the like. A housing 20 is provided that has a mount portion 22 and a display portion 24. The mount portion 22 has a top end 26, a front side 28 and a back side 30. The display portion 24 extends upwardly from the top end 26 and the display portion 24 has a forward surface 32. The mount portion 22 is positioned within the dashboard 16 having the display portion 24 extending outwardly from the dashboard 16. Thus, the forward surface 32 is visible to a driver 34 of the vehicle 12 and the forward surface 32 has indicia 36 printed thereon. The indicia 36 may comprise the words "Passengers in car".

A pair of tabs 38 is provided and each of the tabs 38 has an upper side 40 and a lower side 42. Each of the tabs 38 is attached to the mount portion 22 and each of the tabs 38 is positioned on an associated one of the front side 28 and the back side 30. Each of the tabs 38 is positioned adjacent to the top end 26 and each of the tabs 38 has a plurality of openings 44 extending through the upper side 40 and the lower side 42. The openings 44 are spaced apart from each other and distributed along the tabs 38. The housing 20 is positioned such that the upper side 40 abuts the inner surface 18 of the dashboard 16. A plurality of fasteners 46 each extends through one of the openings 44 and engages the inner surface 18 thereby retaining the housing 20 on the dashboard 16. The fasteners 46 may comprise screws or the like A tracking unit 48 is coupled to the housing 20 and the tracking unit 48 is operationally coupled to the vehicle 12. The tracking unit 48 may be manipulated to record a number of passengers 50 in the vehicle 12 before the vehicle 12 can be turned on. The tracking unit 48 may be manipulated to acknowledge the number of passengers 50 in the vehicle 12 before the vehicle 12 can be turned off. Thus, the tracking unit 48 prevents the passengers 50 from being inadvertently left in the vehicle 12.

The tracking unit 48 comprises a control circuit 52 that is positioned within the display portion 24. A pair of conductors 53 is electrically coupled between the control circuit 52 and the ignition 14. The control circuit 52 is actuatable into a starting sequence such that the ignition 14 is allowed to be turned on. The control circuit 52 is actuatable into a stopping sequence such that the ignition 14 is allowed to be turned off. A switch 54 is attached to the housing 20 and the switch 54 is positioned on the forward surface 32 wherein the switch 54 may be manipulated. The switch 54 is electrically coupled to the control circuit 52 and the switch 54 selectively actuates the control circuit 52 into the starting sequence and the stopping sequence.

A display 56 is attached to the housing 20 and the display 56 is positioned on the forward surface 32 of the display portion 24 wherein the display 56 is configured to be visible to the driver 34 of the vehicle 12. The display 56 is electrically coupled to the control circuit 52. The display 56 displays indicia 58 and the indicia 58 comprise numbers. The display 56 displays the indicia 58 when the control circuit 52 is actuated into the starting sequence and the display 56 ceases displaying the indicia 58 when the control circuit 52 is actuated into the stopping sequence. The display 56 may comprise an LED display or the like. A power supply 60 is positioned within the mount portion 22 and the power supply 60 is electrically coupled between the control circuit 52 and the vehicle 12. The power supply 60 may comprise a conductor 62 that is electrically coupled between the control circuit 52 and the vehicle 12.

In use, the switch 54 is manipulated a number of times corresponding to a number of the passengers 50 in the vehicle 12 when the driver 34 enters the vehicle 12. Thus, the display 56 displays a number corresponding to the number of passengers 50 in the vehicle 12 and the control circuit 52 is actuated into the starting sequence. The ignition 14 is turned on the vehicle 12 is driven to a destination. The switch 54 is manipulated when the vehicle 12 is driven to the destination such that the control circuit 52 is actuated into the stopping sequence and the display 56 ceases displaying the number. Thus, the driver 34 is reminded to prevent the passengers 50 from being inadvertently left in the vehicle 12. The ignition 14 is turned off and the driver 34 and passengers 50 exit the vehicle 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. An alarm assembly configured to issue an alert when at least one passenger is left in a vehicle, said assembly comprising:

a vehicle;

a housing having a mount portion and a display portion, said housing being positioned within said vehicle; and a tracking unit being coupled to said housing, said tracking unit being operationally coupled to said vehicle, said tracking unit being configured to be manipulated to record a number of passengers in said vehicle before said vehicle can be turned on, said tracking unit being configured to be manipulated to acknowledge the number of passengers in said vehicle before said vehicle can be turned off thereby preventing the passengers from being inadvertently left in said vehicle.

2. The assembly according to claim 1, wherein said vehicle has an ignition and a dashboard, said dashboard having an inner surface, said mount portion having a top end, a front side and a back side, said display portion extending upwardly from said top end, said display portion having a forward surface, said mount portion being positioned within said dashboard having said display portion extending outwardly from said dashboard such that said forward surface is configured to be visible to a driver of said vehicle, said forward surface having indicia being printed thereon.

3. The assembly according to claim 2, further comprising a pair of tabs, each of said tabs having an upper side and a lower side, each of said tabs being positioned on an associated one of said front side and said back side, each of said tabs being positioned adjacent to said top end, each of said tabs having a plurality of openings extending through said upper side and said lower side, said openings being spaced apart from each other and distributed along said tabs, said housing being positioned such that said upper side abuts said inner surface of said dashboard.

4. The assembly according to claim 3, further comprising a plurality of fasteners, each of said fasteners extending through one of said openings and engaging said inner surface thereby retaining said housing on said dashboard.

5. The assembly according to claim 1, wherein said tracking unit comprises a control circuit being positioned within said display portion, said control circuit being electrically coupled to said ignition, said control circuit being actuatable into a starting sequence such that said ignition is allowed to be turned on, said control circuit being actuatable into a stopping sequence such that said ignition is allowed to be turned off.

6. The assembly according to claim 5, further comprising:

said display portion having a forward surface; and a switch being attached to said housing, said switch being positioned on said forward surface wherein said switch is configured to be manipulated, said switch being electrically coupled to said control circuit, said switch selectively actuating said control circuit into said starting sequence and said stopping sequence.

7. The assembly according to claim 6, further comprising a display being attached to said housing, said display being positioned on said forward surface of said display portion wherein said display is configured to be visible, said display being electrically coupled to said control circuit.

8. The assembly according to claim 7, wherein said display displays indicia, said indicia comprising numbers, said switch being configured to be manipulated a number of times corresponding to a number of passengers in said vehicle before said vehicle is driven wherein said display displays a number corresponding to the number of passengers in said vehicle and said control circuit is actuated into said starting sequence, said switch being configured to be manipulated when said vehicle is driven to a destination such that said control circuit is actuated into said stopping sequence wherein the passengers are prevented from being inadvertently left in said vehicle.

9. The assembly according to claim 5, further comprising a power supply being positioned within said mount portion, said power supply being electrically coupled between said control circuit and said vehicle.

10. An alarm assembly configured to issue an alert when at least one passenger is left in a vehicle, said assembly comprising:

a vehicle having an ignition and a dashboard, said dashboard having an inner surface;

a housing having a mount portion and a display portion, said mount portion having a top end, a front side and a back side, said display portion extending upwardly from said top end, said display portion having a forward surface, said mount portion being positioned within said dashboard having said display portion extending outwardly from said dashboard such that said forward surface is configured to be visible to a driver of said vehicle, said forward surface having indicia being printed thereon;

a pair of tabs, each of said tabs having an upper side and a lower side, each of said tabs being attached to said mount portion, each of said tabs being positioned on an associated one of said front side and said back side, each of said tabs being positioned adjacent to said top end, each of said tabs having a plurality of openings extending through said upper side and said lower side, said openings being spaced apart from each other and distributed along said tabs, said housing being positioned such that said upper side abuts said inner surface of said dashboard;

a plurality of fasteners, each of said fasteners extending through one of said openings and engaging said inner surface thereby retaining said housing on said dashboard; and a tracking unit being coupled to said housing, said tracking unit being operationally coupled to said vehicle, said tracking unit being configured to be manipulated to record a number of passengers in said vehicle before said vehicle can be turned on, said tracking unit being configured to be manipulated to acknowledge the number of passengers in said vehicle before said vehicle can be turned off thereby preventing the passengers from being inadvertently left in said vehicle, said tracking unit comprising:

a control circuit being positioned within said display portion, said control circuit being electrically coupled to said ignition, said control circuit being actuatable into a starting sequence such that said ignition is allowed to be turned on, said control circuit being actuatable into a stopping sequence such that said ignition is allowed to be turned off, a switch being attached to said housing, said switch being positioned on said forward surface wherein said switch is configured to be manipulated, said switch being electrically coupled to said control circuit, said switch selectively actuating said control circuit into said starting sequence and said stopping sequence, a display being attached to said housing, said display being positioned on said forward surface of said display portion wherein said display is configured to be visible to a driver of said vehicle, said display being electrically coupled to said control circuit, said display displaying indicia, said indicia comprising numbers, said switch being configured to be manipulated a number of times corresponding to a number of passengers in said vehicle before said vehicle is driven wherein said display displays a number corresponding to the number of passengers in said vehicle and said control circuit is actuated into said starting sequence, said switch being configured to be manipulated when said vehicle is driven to a destination such that said control circuit is actuated into said stopping sequence wherein the passengers are prevented from being inadvertently left in said vehicle, and a power supply being positioned within said mount portion, said power supply being electrically coupled between said control circuit and said vehicle.

* * * * *